United States Patent
Shapson

(10) Patent No.: US 7,701,309 B2
(45) Date of Patent: Apr. 20, 2010

(54) POWER INSERTER MODULE

(75) Inventor: Jay F. Shapson, Englishtown, NJ (US)

(73) Assignee: Extreme Broadband Engineering, LLC, Millstone Township, NJ (US)

( * ) Notice: Subject to any disclaimer, the term of this patent is extended or adjusted under 35 U.S.C. 154(b) by 931 days.

(21) Appl. No.: 11/497,722

(22) Filed: Aug. 2, 2006

(65) Prior Publication Data
US 2007/0040948 A1  Feb. 22, 2007

Related U.S. Application Data

(60) Provisional application No. 60/708,622, filed on Aug. 16, 2005.

(51) Int. Cl.
*H01P 5/12* (2006.01)
*H01R 12/14* (2006.01)
*H01R 24/02* (2006.01)

(52) U.S. Cl. .............. 333/24 R; 333/12; 333/100; 439/676

(58) Field of Classification Search .......... 333/24 R, 333/12, 100, 132; 439/620.03, 676
See application file for complete search history.

(56) References Cited

U.S. PATENT DOCUMENTS

| | | | |
|---|---|---|---|
| 5,833,496 A | 11/1998 | Hollander et al. | 439/620 |
| 6,229,408 B1 * | 5/2001 | Jovanovich et al. | 333/167 |
| 6,529,087 B2 * | 3/2003 | Kawato | 333/12 |
| 6,746,279 B1 | 6/2004 | Lopez | 439/620 |
| 7,024,165 B2 * | 4/2006 | Stepp et al. | 455/81 |
| 2001/0036841 A1 * | 11/2001 | Wilson | 455/557 |
| 2003/0078005 A1 * | 4/2003 | Recht | 455/63 |
| 2003/0179533 A1 | 9/2003 | Jones et al. | 361/118 |
| 2004/0219837 A1 | 11/2004 | Cherniski et al. | 439/620 |
| 2005/0101171 A1 | 5/2005 | Ramsey et al. | 439/215 |
| 2006/0041922 A1 * | 2/2006 | Shapson | 725/127 |

FOREIGN PATENT DOCUMENTS

| | | | |
|---|---|---|---|
| JP | 2002/151860 A | | 5/2002 |
| JP | 2002141147 A | * | 5/2002 |

* cited by examiner

*Primary Examiner*—Benny Lee
*Assistant Examiner*—Alan Wong
(74) *Attorney, Agent, or Firm*—Watov & Kipnes, P.C.; Kenneth Watov

(57) ABSTRACT

A power inserter module includes an FIC male first port for a direct connection without use of cable to a female F-type output port of a DC source of power, an F-type female second port for connection to an RF amplifier to provide DC power thereto and receive RF signals therefrom, an F-type female connector third port for delivering the RF signals to a subscriber, and an electrical circuit for both connecting DC power from the first port to the second port while blocking RF signals from the first port, and connecting RF signals from the second port to the third port while blocking DC power from the latter.

42 Claims, 6 Drawing Sheets

POWER INSERTER MODULE

RELATED APPLICATION

This Application is related to Provisional Application 60/708,622, filed on Aug. 16, 2005, for "Power Inserter Module," the teachings of which are incorporated herein by reference to the extent that they do not conflict herewith.

FIELD OF THE INVENTION

The present invention is related generally to cable television devices, and more specifically to power inserter devices.

BACKGROUND OF THE INVENTION

Power inserter devices are utilized in cable television (CATV), wireless (e.g., MMDS), satellite reception and other communication systems. Conventional power inserter devices typically require jumper cables for supporting proper implementation. However, the use of such jumper cables increases installation space and the number of connections needed, and further introduces uwanted cable bends, all of which can adversely diminish performance and reliability of the power inserter device.

Accordingly, there is a need for a power inserter designed to overcome the problems associated with conventional power inserter devices. There is a further need for a power inserter that eliminates the need for jumper cables, thereby reducing the number of connections, avoiding unwanted cable bends, and minimizing installation space for an enhanced interface connection.

SUMMARY OF THE INVENTION

The present invention provides a power inserter module including means for directly connecting the module without use of cabling to a DC power supply, means for coupling the power to an RF amplifier, and means for coupling RF signals from the amplifier, while blocking DC power to an output port connected, for example, to a subscriber's television set, or converter, or modem.

DETAILED DESCRIPTION OF PREFERRED EMBODIMENTS

Figure 1:
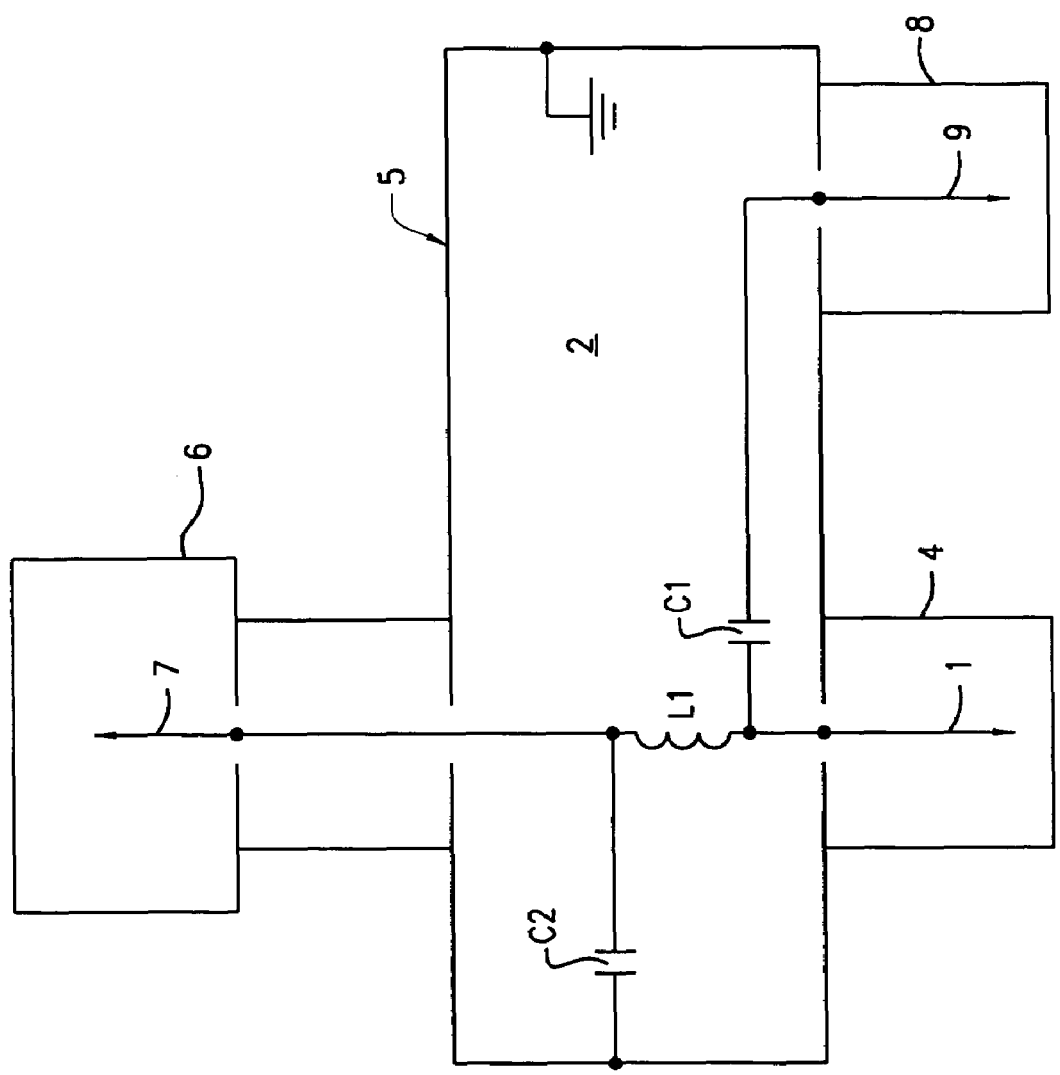
FIG. 1 shows a circuit schematic diagram for one embodiment of the invention.

With reference to FIG. 1, the present power inserter module 2 in one embodiment of the invention includes an inductor L1 connected from a male pin 7 of a DC power port 6, to a female socket 1 of an RF and DC power port 4, for coupling DC power from a DC power supply (not shown) connected to port 6 to an amplifier connected to port 4. A capacitor C2 is connected between the end of the inductor L1 connected to a male pin 7 of port 6 and ground, whereby the inductor L1 provides a relatively high impedance to RF signals from the amplifier substantially preventing the signals from reaching the DC power port 6, and the capacitor C2 shunts to ground RF signals that may travel through inductor L1. As a result, the combination of the high impedance of conductor L1 to RF signals, and the low impedance to RF signals provided by capacitor C2, effectively prevent RF signals from passing to the DC power port 6 and therefrom to a DC power supply connected thereto. A capacitor C1 is connected between the other end of conductor L1 and a female socket 9 of a subscriber RF port 8 for both passing RF signals from the amplifier provided via port 4, while effectively blocking DC voltage from the subscriber port 8, thereby protecting a subscriber's TV, or modem, or other device that may be connected to port 8 for receiving the RF signals.

Figure 4:
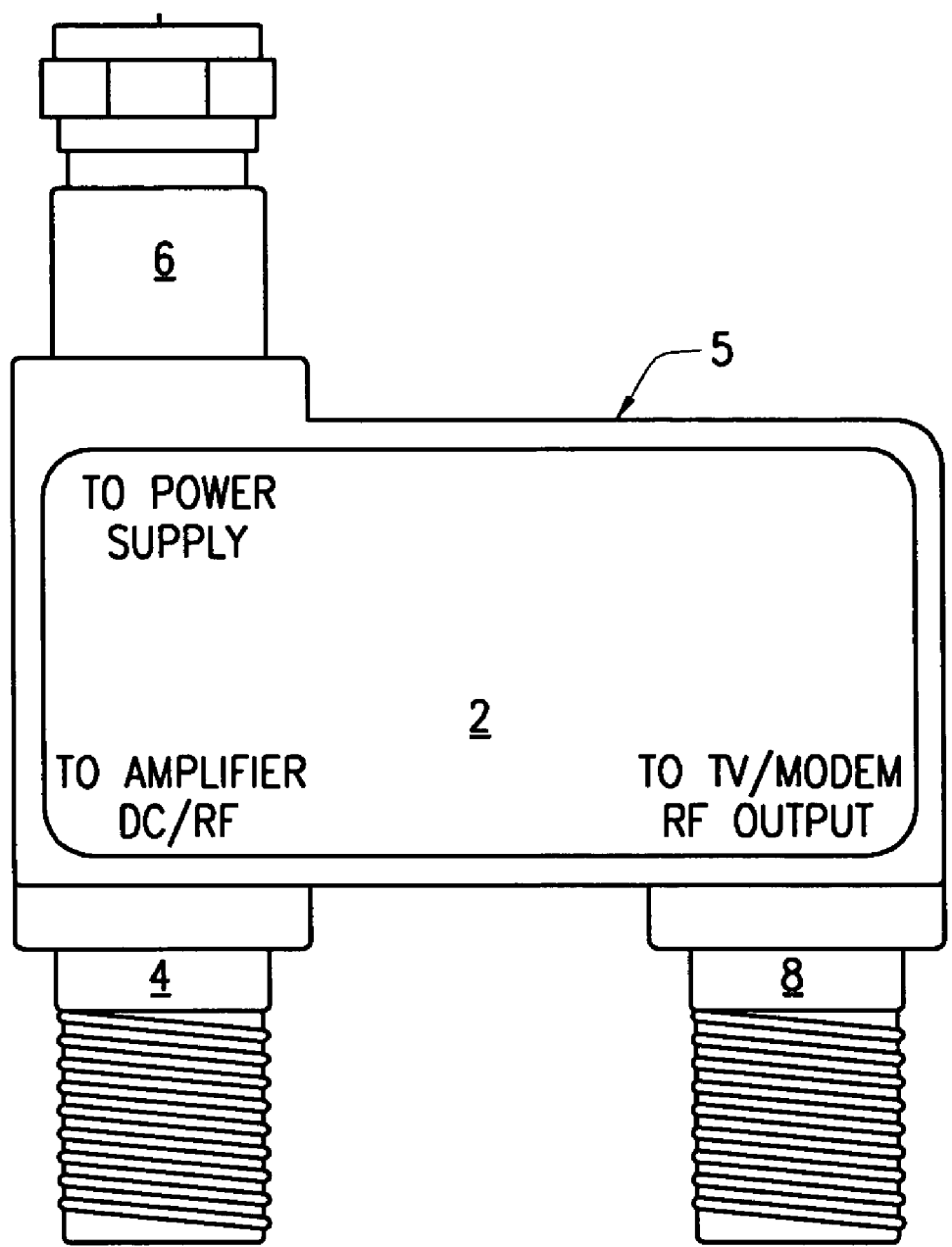
FIG. 4 shows a top pictorial view of a housing and associated ports for one embodiment of the invention.

With reference to FIG. 4, the housing 5 and ports 4, 6, and 8, respectively, for a power inserter module 2 for one embodiment of the invention are shown. An FIC connector is used to provide the port 6, and permits the power inserter module 2 to be directly connected to a power supply 20 (see FIG. 7) without use of any connecting cables. Port 4, for connection to an amplifier for supplying DC voltage thereto, and for receiving RF signals from the amplifier, is provided by an F-type female port, for example. Port 8 for providing RF signals to each subscriber's television or modem, for example, is also provided by an F-type female port, in this example. Note that the use of F-type female ports is not meant to be limiting, and they can in certain applications be male ports, for example.

Figure 5:
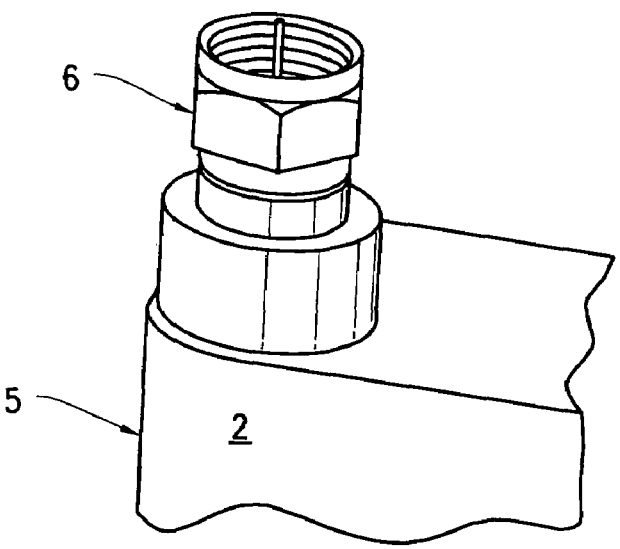
FIG. 5 shows a closeup pictorial view of an unique FIC port for one embodiment of the invention.

FIG. 5 is a close-up view of a power port 6 utilizing a male FIC connector.

Figure 6:
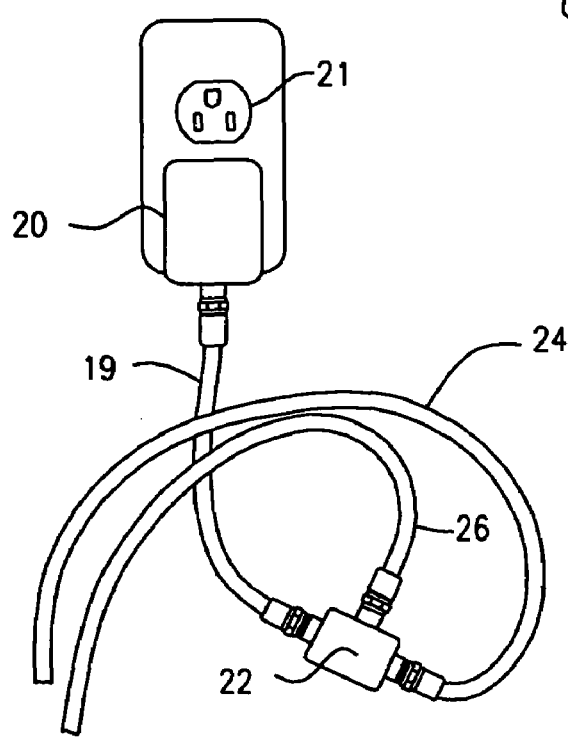
FIG. 6 shows a standard home installation pictorial view not having the benefit of the present invention.

FIG. 6 is a pictorial view of a standard home installation requiring a cable 19 to be connected from a DC power supply 20 to a power inserter 22 having a cable connection 24 to an amplifier for providing power thereto, and another cable 26 for supplying RF signals to a subscriber's television set or modem.

Figure 7:
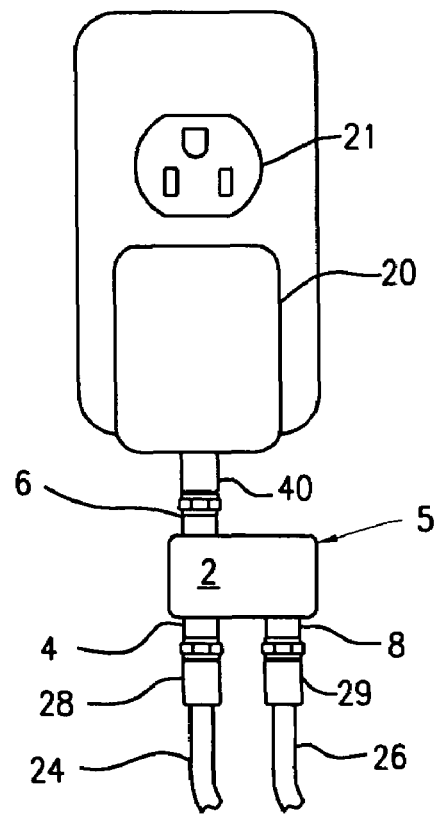
FIG. 7 is a pictorial view of a home installation including the present invention.
Figure 9:
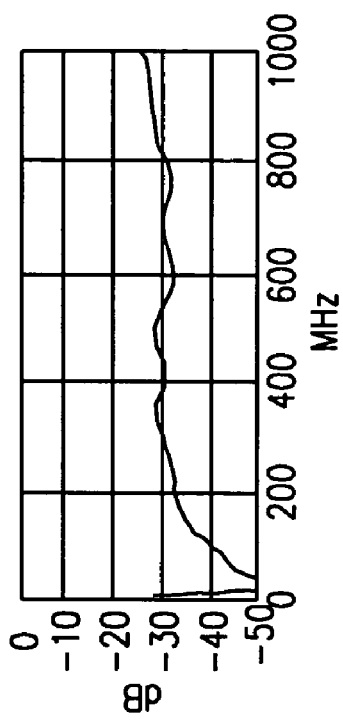
FIG. 9 is a curve showing the return loss characteristics for an Amplifier DC/RF port for the power inserter of FIG. 4.
Figure 11:
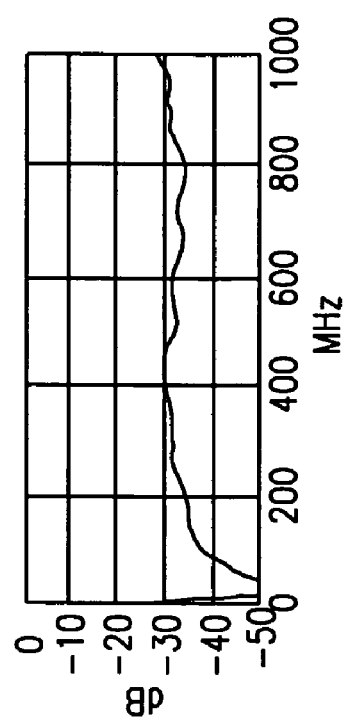
FIG. 11 is a curve of the return loss at the RF output port for the power inserter module relative to FIG. 4.
Figure 8:
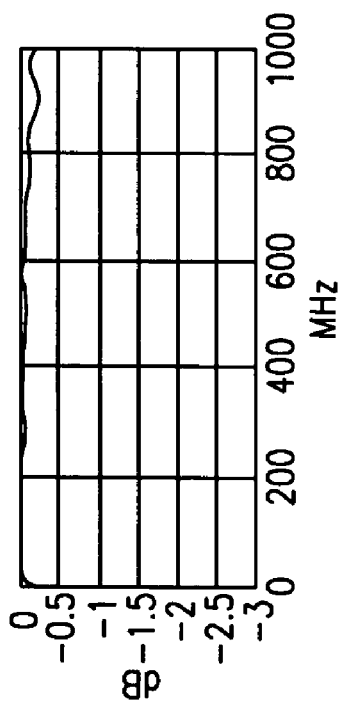
FIG. 8 is a curve showing the insertion loss between the two RF ports for a power inserter module for one embodiment of the invention.
Figure 10:
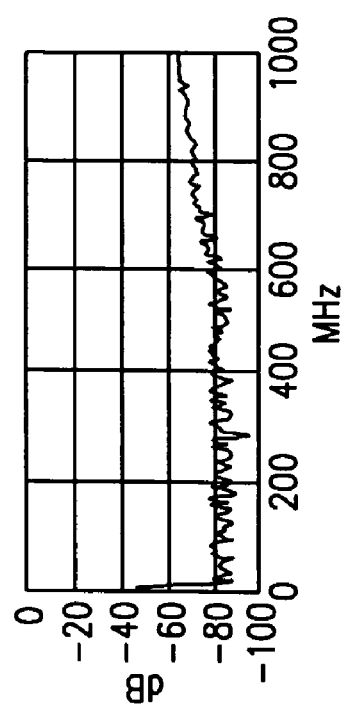
FIG. 10 is a curve showing isolation characteristics for transmission loss versus frequency between the two RF ports for the power inserter module of FIG. 4.

FIG. 7 is a pictorial view showing the improvement in both the appearance and reliability provided by the power inserter module 2 of the present invention, whereby its male FIC port 6 is directly connected to an F-type female port 40 of the DC power supply 20. The DC/RF port 4 has an F-type female port directly connected to a male connector 28 of cable 24 for providing power to an amplifier (not shown) connected at the other end of cable 24, and receives RF signals from the amplifier, as previously mentioned. Also, port 8 has an F-type female port connected to a male F-type connector 29 at one end of cable 26, for providing RF signals to a subscriber. Cable 19 of FIG. 6 is eliminated.

Figure 2:
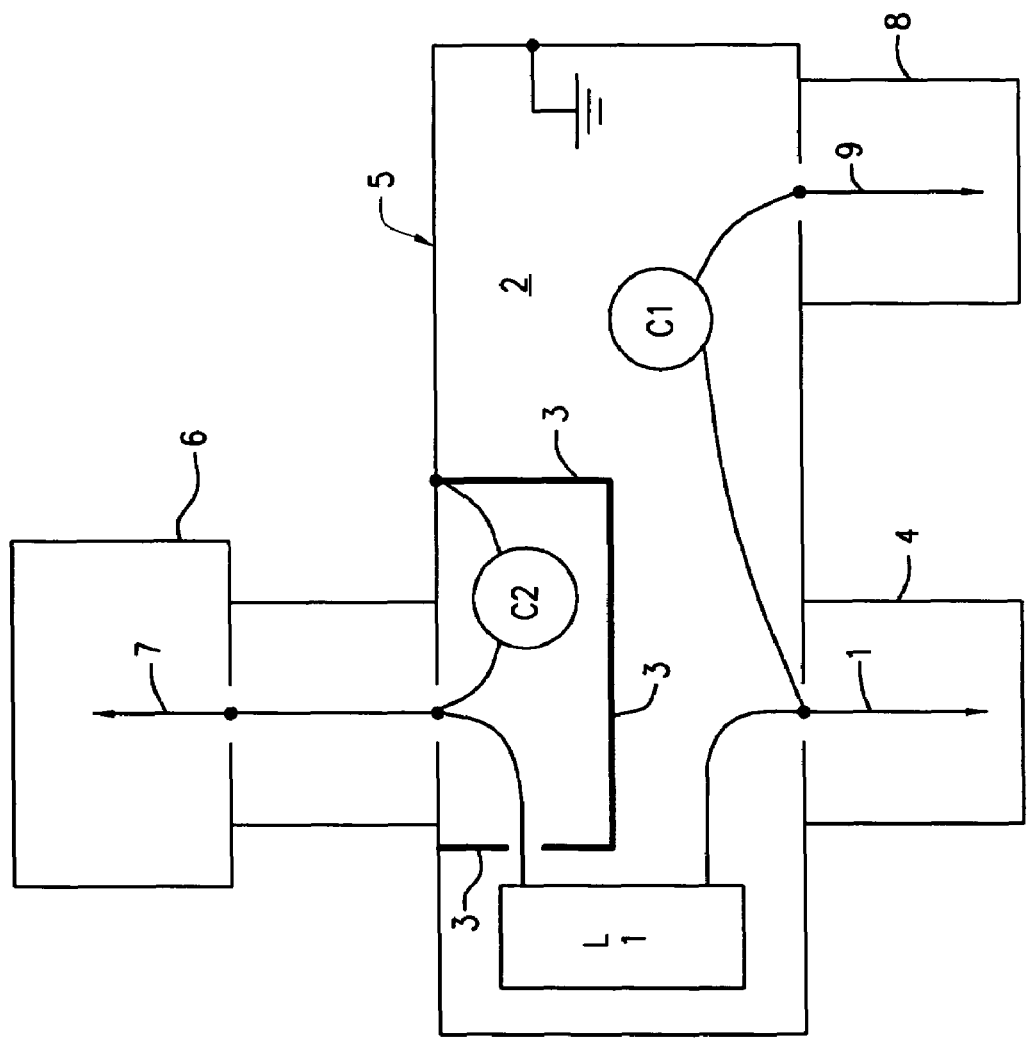
FIG. 2 shows the mechanical layout and interconnection of circuit components and a ground shield within a module housing for an embodiment of the invention.

In one embodiment of the invention, the inductor L1 is 10 millihenrys (mh), capacitor C1 is 2200 picofarads (pf), and capacitor C2 is 5600 picofarads (pf). With reference to FIG. 2, the capacitors C1 and C2 are physically mounted within the housing 5 for power inserter module 2 as shown, and interconnected as shown to inductor L1, otherwise electrically interconnections are as previously described. A ground shield 3 is used in the central interior portion of the housing 5 for providing RF radiation shielding for Power Supply port 6 to further protect a DC power supply connected thereto from RF associated with ports 4 and 8. Note that the shield 3 typically consists of ferromagnetic material. The values of capacitor C1, C2, and inductor L1, as indicated herein from tests made in an engineering prototype are not meant to be limiting, and can in certain applications be other than the values provided herein.

Figure 3:
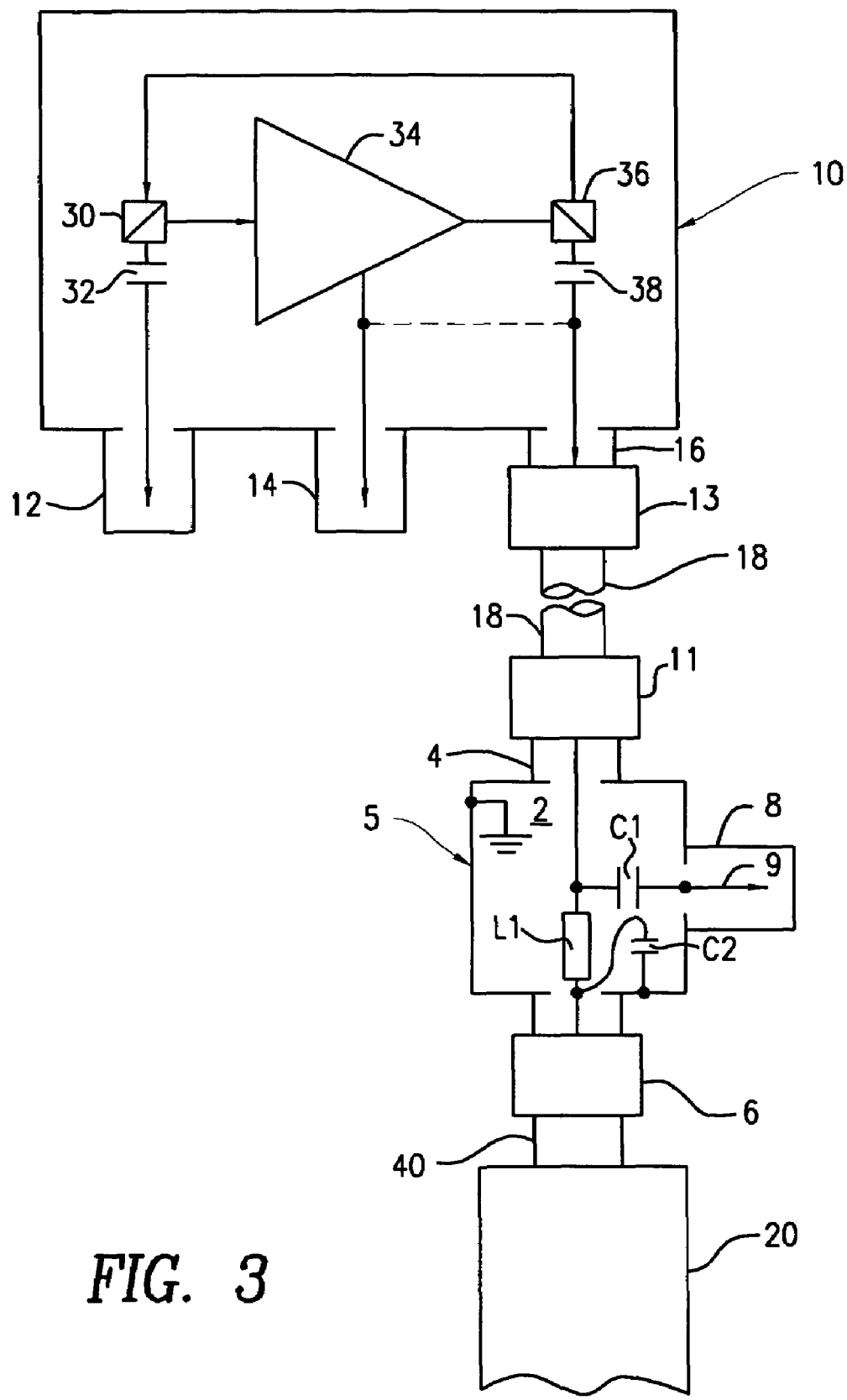
FIG. 3 shows a block schematic diagram of a typical cable antenna television system installation including the power inserter module of the present invention.

FIG. 3 shows the present power inserter module 2 connected into a typical installation, that includes a cable antenna television subscriber amplifier 10 having an input port 12 for receiving RF signals from a cable television system, a power port 14, and a combined power port and RF port 16. Port 16 connected by a connector 13 and a jumper cable 18 to port 4 (via connector 11) of the present power inserter module 2, for both receiving DC power from the latter, and for supplying RF signals to the latter. In turn power inserter module 2 feeds RF signals via capacitor C1 to its port 8 for delivery to a subscriber, as previously mentioned. Also, as previously mentioned, the DC power FIC port 6 of power inserter module 2 is connected directly to a DC power supply 20 via the latter's port 40. With the values previously given for the capacitor C1, capacitor C2, and inductor L1, and when used in a system as shown in FIG. 3, the present power inserter module 2 provides an insertion loss of less than 0.3 dB from 5 MHz to 1000 MHz, a return loss greater than 25 dB, and an RF isolation to power supply 20 of greater than 60 dB. In this regard, FIGS. 8 through 11 show curves of insertion loss between ports 4 and 8, return loss DC/RF at port 4, RF isolation between ports 4 and 8, and return loss RF at port 8, respectively. Note that amplifier 10 includes an RF amplifier 34, RF signal diverters 30 and 36, and DC blocking capacitors 32 and 38, are connected as shown. Also note that in FIG. 3, power inserter module 2 shows an alternative arrangement for the ports, whereby ports 4 and 6 are located on opposing ends of power inserter module 2, and port 8 is located on one side of power inserter module 2.

Although various embodiments of the present invention have been shown and described, they are not meant to be limiting. Those of skill in the art may recognize certain modifications to these embodiments, which modifications are meant to be covered by the spirit and scope of the appended claims.

What is claimed is:

1. A power inserter module, comprising:
a first port configured for direct electrical connection therefrom to a source of DC power, without use of electrical cable;
a second port configured for connection to an RF amplifier to provide the DC power thereto and receive RF signals therefrom;
a third port configured for connection to a subscriber's device for delivering said RF signals thereto;
first electrical circuit means for both electrically connecting the DC power from said first port to said second port, while blocking the RF signals received at said second port from being applied to said first port;
second electrical circuit means for both electrically connecting the RF signals from said second port to said third port, while blocking the DC power from electrical connection from the first port from reaching said third port;
said first port being an FIC male port;
said second port being a female port; and
said third port being an F-type female port.

2. The power inserter module of claim 1, further including:
a source of reference potential;
said first electrical circuit means includes:
an inductor having one end connected to said first port, and another end connected to said second port; and
a first capacitor having one end directly connected to said one end of said inductor and said first port, and having another end connected to said source of reference potential.

3. The power inserter module of claim 2, wherein said second electrical circuit means includes:
a second capacitor directly connected at one end to said another end of said inductor and said second port, and at another end to said third port.

4. The power inserter module of claim 3, further including:
an RF radiation shield positioned for blocking the transmission of RF radiation occurring in the vicinity of said second and third ports from reaching said first port;
said first capacitor being enclosed by said RF shield proximate said first port; and
said second capacitor being located between said RF shield and said second and third ports.

5. The power inserter module of claim 4, further including:
said inductor being located between said radiation shield and said second port.

6. The power inserter module of claim 3, further including:
an RF radiation shield positioned for blocking the transmission of RF radiation occurring in the vicinity of said second and third ports from reaching said first port;
said first capacitor being enclosed by said RF shield proximate said first port; and
said second capacitor being located between said RF shield and said second and third ports; and
said inductor being located between said radiation shield and said second port.

7. The power inserter of claim 3, further including:
a housing;
said first port being located on one end of said housing;
said second port being located on an opposing end to said one end of said housing; and
said third port being located on a side of said housing between said first and second ports.

8. The power inserter module of claim 1, further including an RF radiation shield for shielding said first port from RF radiation occurring in the vicinity of said second and third ports.

9. The power inserter module of claim 8, wherein said second electrical circuit means is located between said RF radiation shield and said second and third ports.

10. The power inserter of claim 8, wherein said RF radiation shield consists of ferromagnetic material.

11. The power inserter module of claim 1, further including:
a housing;
said first port being located on one side of said housing;
said second and third ports being located on an opposite side of said housing in spaced apart relationship.

12. The power inserter module of claim 11, wherein said housing consists of electrically conductive material.

13. The power inserter of claim 11, wherein said first and second electrical circuit means are located wholly within said housing.

14. The power inserter of claim 13, further including:
an RF radiation shield located within said housing for RF shielding said first port from said second and third ports.

15. A power inserter module, comprising:
a first port configured for direct electrical connection therefrom to a source of DC power, without use of electrical cable;
a second port configured for connection to an RF amplifier to provide the DC power thereto and receive RF signals therefrom;
a third port configured for connection to a subscriber's device for delivering said RF signals thereto;
first electrical circuit means for both electrically connecting the DC power from said first port to said second port, while blocking the RF signals received at said second port from being applied to said first port;
second electrical circuit means for both electrically connecting the RF signals from said second port to said third port, while blocking the DC power from electrical connection from the first port from reaching said third port; and
an RF radiation shield for shielding said first port from RF radiation occurring in the vicinity of said second and third ports, wherein said second electrical circuit means is located between said RF radiation shield and said second and third ports.

16. The power inserter module of claim 15, further including:
said first port being an FIC male port;
said second port being a female port; and
said third port being an F-type female port.

17. The power inserter module of claim 15, further including:
a source of reference potential;
said first electrical circuit means includes:
an inductor having one end connected to said first port, and another end connected to said second port; and
a first capacitor having one end directly connected to said one end of said inductor and said first port, and having another end connected to said source of reference potential.

18. The power inserter module of claim 17, wherein said second electrical circuit means includes:
a second capacitor directly connected at one end to said another end of said inductor and said second port, and at another end to said third port.

19. The power inserter module of claim 18, further including:
said first capacitor being enclosed by said RF shield proximate said first port; and
said second capacitor being located between said RF shield and said second and third ports.

20. The power inserter module of claim 19, further including:
said inductor being located between said radiation shield and said second port.

21. The power inserter module of claim 18, further including:
said first capacitor being enclosed by said RF shield proximate said first port; and
said second capacitor being located between said RF shield and said second and third ports; and
said inductor being located between said radiation shield and said second port.

22. The power inserter of claim 18, further including:
a housing;
said first port being located on one end of said housing;
said second port being located on an opposing end to said one end of said housing; and
said third port being located on a side of said housing between said first and second ports.

23. The power inserter module of claim 15, further including:
a housing;
said first port being located on one side of said housing;
said second and third ports being located on an opposite side of said housing in spaced apart relationship.

24. The power inserter module of claim 23, wherein said housing consists of electrically conductive material.

25. The power inserter of claim 23, wherein said first and second electrical circuit means are located wholly within said housing.

26. The power inserter of claim 15, wherein said RF radiation shield consists of ferromagnetic material.

27. A power inserter module, comprising:
a first port configured for direct electrical connection therefrom to a source of DC power, without use of electrical cable;
a second port configured for connection to an RF amplifier to provide the DC power thereto and receive RF signals therefrom;
a third port configured for connection to a subscriber's device for delivering said RF signals thereto;
first electrical circuit means for both electrically connecting the DC power from said first port to said second port, while blocking the RF signals received at said second port from being applied to said first port;
second electrical circuit means for both electrically connecting the RF signals from said second port to said third port, while blocking the DC power from electrical connection from the first port from reaching said third port;
a source of reference potential;
said first electrical circuit means includes:
an inductor having one end connected to said first port, and another end connected to said second port;
a first capacitor having one end directly connected to said one end of said inductor and said first port, and having another end connected to said source of reference potential;
said second electrical circuit means includes:
a second capacitor directly connected at one end to said another end of said inductor and said second port, and at another end to said third port;
an RF radiation shield positioned for blocking the transmission of RF radiation occurring in the vicinity of said second and third ports from reaching said first port;
said first capacitor being enclosed by said RF shield proximate said first port; and
said second capacitor being located between said RF shield and said second and third ports.

28. The power inserter module of claim 27, further including:
said first port being an FIC male port;
said second port being a female port; and
said third port being an F-type female port.

29. The power inserter module of claim 27, further including:
said inductor being located between said radiation shield and said second port.

30. The power inserter module of claim 27, further including:
a housing;
said first port being located on one side of said housing;

said second and third ports being located on an opposite side of said housing in spaced apart relationship.

31. The power inserter module of claim 30, wherein said housing consists of electrically conductive material.

32. The power inserter of claim 30, wherein said first and second electrical circuit means are located wholly within said housing.

33. The power inserter of claim 27, wherein said RF radiation shield consists of ferromagnetic material.

34. The power inserter of claim 27, further including:
a housing;
said first port being located on one end of said housing;
said second port being located on an opposing end to said one end of said housing; and
said third port being located on a side of said housing between said first and second ports.

35. A power inserter module, comprising:
a first port configured for direct electrical connection therefrom to a source of DC power, without use of electrical cable;
a second port configured for connection to an RF amplifier to provide the DC power thereto and receive RF signals therefrom;
a third port configured for connection to a subscriber's device for delivering said RF signals thereto;
first electrical circuit means for both electrically connecting the DC power from said first port to said second port, while blocking the RF signals received at said second port from being applied to said first port;
second electrical circuit means for both electrically connecting the RF signals from said second port to said third port, while blocking the DC power from electrical connection from the first port from reaching said third port;
a source of reference potential;
said first electrical circuit means includes:
an inductor having one end connected to said first port, and another end connected to said second port;
a first capacitor having one end directly connected to said one end of said inductor and said first port, and having another end connected to said source of reference potential;
said second electrical circuit means includes:
a second capacitor directly connected at one end to said another end of said inductor and said second port, and at another end to said third port;
an RF radiation shield positioned for blocking the transmission of RF radiation occurring in the vicinity of said second and third ports from reaching said first port;
said first capacitor being enclosed by said RF shield proximate said first port;
said second capacitor being located between said RF shield and said second and third ports; and
said inductor being located between said radiation shield and said second port.

36. The power inserter module of claim 35, further including:
said first port being an FIC male port;
said second port being a female port; and
said third port being an F-type female port.

37. The power inserter of claim 35, further including:
a housing;
said first port being located on one side of said housing;
said second and third ports being located on an opposite side of said housing in spaced apart relationship.

38. The power inserter module of claim 37, wherein said housing consists of electrically conductive material.

39. The power inserter of claim 37, wherein said first and second electrical circuit means are located wholly within said housing.

40. The power inserter of claim 39, further including:
the RF radiation shield located within said housing.

41. The power inserter of claim 35, wherein said RF radiation shield consists of ferromagnetic material.

42. The power inserter of claim 35, further including:
a housing;
said first port being located on one end of said housing;
said second port being located on an opposing end to said one end of said housing; and
said third port being located on a side of said housing between said first and second ports.

* * * * *